United States Patent [19]
Donner et al.

[11] Patent Number: 5,551,303
[45] Date of Patent: Sep. 3, 1996

[54] PRESSURE-MEASURING ARRANGEMENT WITH CONDUCTIVE FOIL SHIELDING

[75] Inventors: Arno Donner, Fuldabrück; Norbert Gill; Jürgen Lange, both of Vellmar; Volker Schröbel, Helsa; Rolf Schade, Kassel, all of Germany

[73] Assignee: ENVEC Mess-und Regeltechnik GmbH + Co., Germany

[21] Appl. No.: 349,608

[22] Filed: Dec. 5, 1994

[30] Foreign Application Priority Data

Dec. 14, 1993 [EP] European Pat. Off. ............ 93810874

[51] Int. Cl.⁶ .................................................. G01L 9/04
[52] U.S. Cl. ................................ 73/726; 73/727; 73/706; 73/720
[58] Field of Search ................. 338/42; 73/706, 73/720, 721, 726, 727

[56] References Cited

U.S. PATENT DOCUMENTS

| | | |
|---|---|---|
| 4,809,555 | 3/1989 | Kunz ........................................ 73/727 |
| 4,903,000 | 2/1990 | Yajima et al. . |
| 5,436,491 | 7/1995 | Hase et al. ............................ 73/726 X |

FOREIGN PATENT DOCUMENTS 57197435  12/1982  Japan .

WO91/04475  4/1991  WIPO .

Primary Examiner—Richard Chilcot
Assistant Examiner—Joseph L. Felber
Attorney, Agent, or Firm—Barnes & Thornburg

[57] ABSTRACT

To ensure insensitivity to electromagnetic interference and to charge influences from the oil fill and achieve good long-term stability, this pressure-measuring arrangement comprises: a pressure sensor having a base and an associated diaphragm with strain gages deposited thereon; a header of insulating material with leads and with an oil filler neck, said header of insulating material having the base mounted thereon, and said leads making electrical contacts to the strain gages; a metal body having a first central recess in a first cross-sectional surface, a second central recess in a second cross-sectional surface facing away from the first cross-sectional surface, and a hole connecting the first recess with the second recess, said first cross-sectional surface being tightly joined at its edge to the header of insulating material, and said first recess accommodating the substrate and diaphragm without touching them; an electrically conductive foil having an opening, said foil being disposed in the first recess as close as possible to, and covering but not touching, the strain gages and connected to ground; a metallic separating diaphragm fitted in the second recess and closing the latter at its edge; and an oil fill in the recesses and in the hole.

12 Claims, 3 Drawing Sheets

PRESSURE-MEASURING ARRANGEMENT WITH CONDUCTIVE FOIL SHIELDING

FIELD OF THE INVENTION

The present invention relates to pressure-measuring arrangements with a pressure sensor having a base and an associated diaphragm with strain gages deposited thereon.

BACKGROUND OF THE INVENTION

Applicant has, for some time, been selling a pressure-measuring arrangement comprising:

a pressure sensor having a base and an associated diaphragm with strain gages deposited thereon;

a header of insulating material with leads and with an oil filler neck, said header of insulating material having the base mounted thereon, and said leads making electrical contacts to the strain gages;

a metal body having a first central recess in a first cross-sectional surface, a second central recess in a second cross-sectional surface facing away from the first cross-sectional surface, and a hole connecting the first recess with the second recess, said first cross-sectional surface being tightly joined at its edge to the header of insulating material, and said first recess accommodating the substrate and diaphragm without touching them;

a metallic separating diaphragm fitted in the second recess and closing the latter at its edge; and an oil fill in the recesses and in the hole.

This pressure-measuring arrangement, which is in public use, is in need of further improvement regarding its sensitivity to electromagnetic interference and to charge influences from the oil fill and regarding its long-term stability.

SUMMARY OF THE INVENTION

To attain these objects, the invention provides a pressure-measuring arrangement comprising:

a pressure sensor having a base and an associated diaphragm with strain gages deposited thereon;

a header of insulating material with leads and with an oil filler neck, said header of insulating material having the base mounted thereon, and said leads making electrical contacts to the strain gages;

a metal body having a first central recess in a first cross-sectional surface, a second central recess in a second cross-sectional surface facing away from the first cross-sectional surface, and a hole connecting the first recess with the second recess, said first cross-sectional surface being tightly joined at its edge to the header of insulating material, and said first recess accommodating the substrate and diaphragm without touching them;

an electrically conductive foil having an opening, said foil being disposed in the first recess as close as possible to, and covering but not touching, the strain gages and connected to ground;

a metallic separating diaphragm fitted in the second recess and closing the latter at its edge; and an oil fill in the recesses and in the hole.

In a preferred embodiment of the invention, a pressure feed pipe extends through the header of insulating material and the base so as to ensure oil tightness.

In another preferred embodiment, a caselike extension of the metal body is provided on the header side.

This preferred embodiment can be further improved by providing a further electrically conductive foil along the inside of the extension and connecting it to ground.

The invention will become more apparent from the following description of embodiments taken in conjunction with the accompanying schematic drawings, in which like parts are designated by like reference characters.

DETAILED DESCRIPTION OF THE DRAWINGS

Figure 1A:
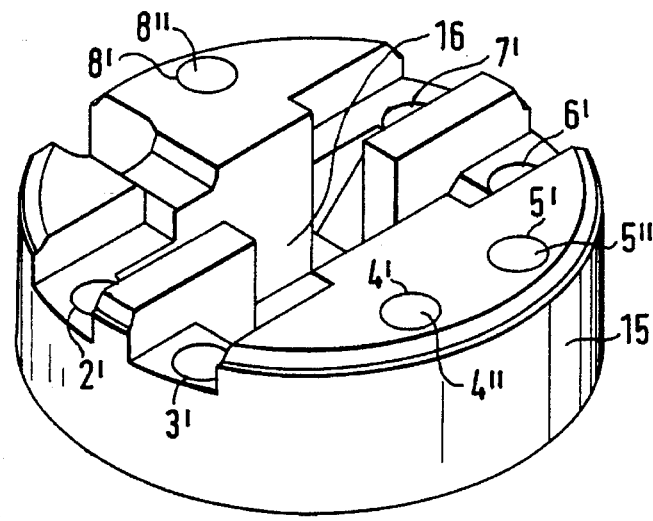
FIGS. 1a, 1b, and 1c are perspective exploded view of those parts of the pressure-measuring arrangement which are essential for the operation of the sensor.
Figure 1B:
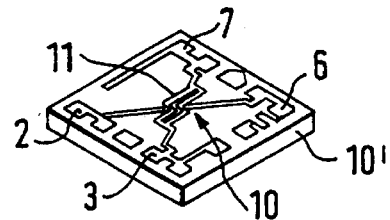
Figure 1C:
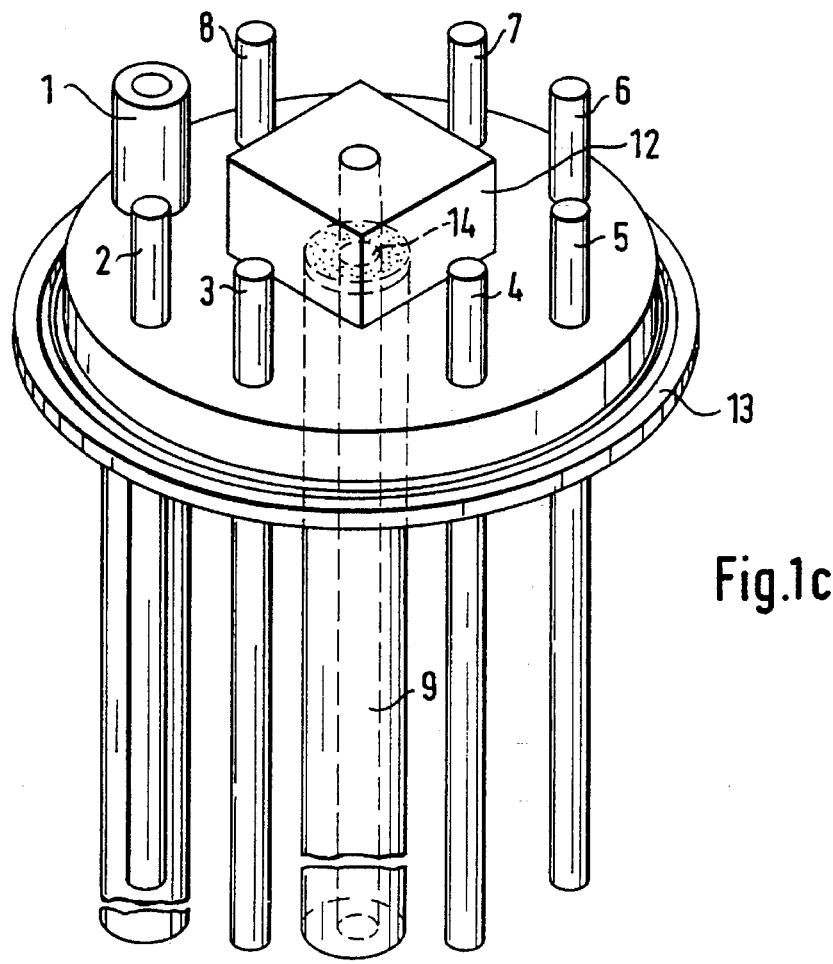

In FIGS. 1a–c, the parts of a pressure-measuring arrangement according to the invention which are essential for the operation of the pressure sensor are shown in a perspective exploded view. A pressure sensor comprises a diaphragm 10 and a base 12. The diaphragm 10 is formed at the center of a substrate 10' by providing the latter with a recess on the bottom side so that the diaphragm 10 represents a thinner central portion of the substrate 10'. The diaphragm 10 has strain gages 11 deposited thereon which are connected by conductive strips to contact pads provided at the edge of the diaphragm.

The diaphragm 10 is made of glass or silicon, for example. The strain gages 11 are of polycrystalline silicon, so-called polysilicon. In the case of a glass diaphragm, the polysilicon was deposited direct; in the case of a silicon diaphragm, it was deposited on an $SiO_2$ layer provided on the diaphragm. The base 12 is made of glass or silicon, for example.

Figure 2:
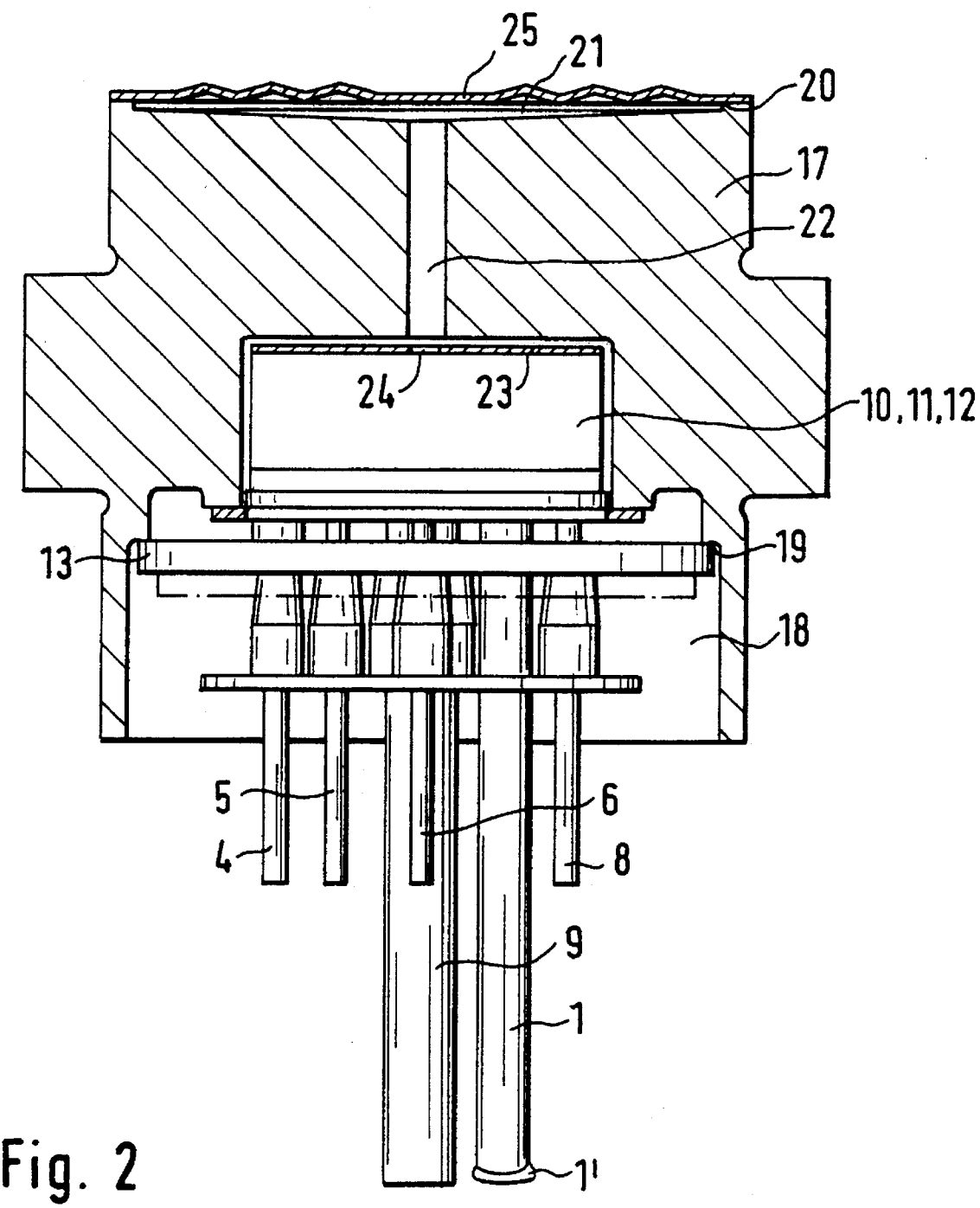
FIG. 2 is a sectional view of a finished pressure-measuring arrangement.
Figure 3:
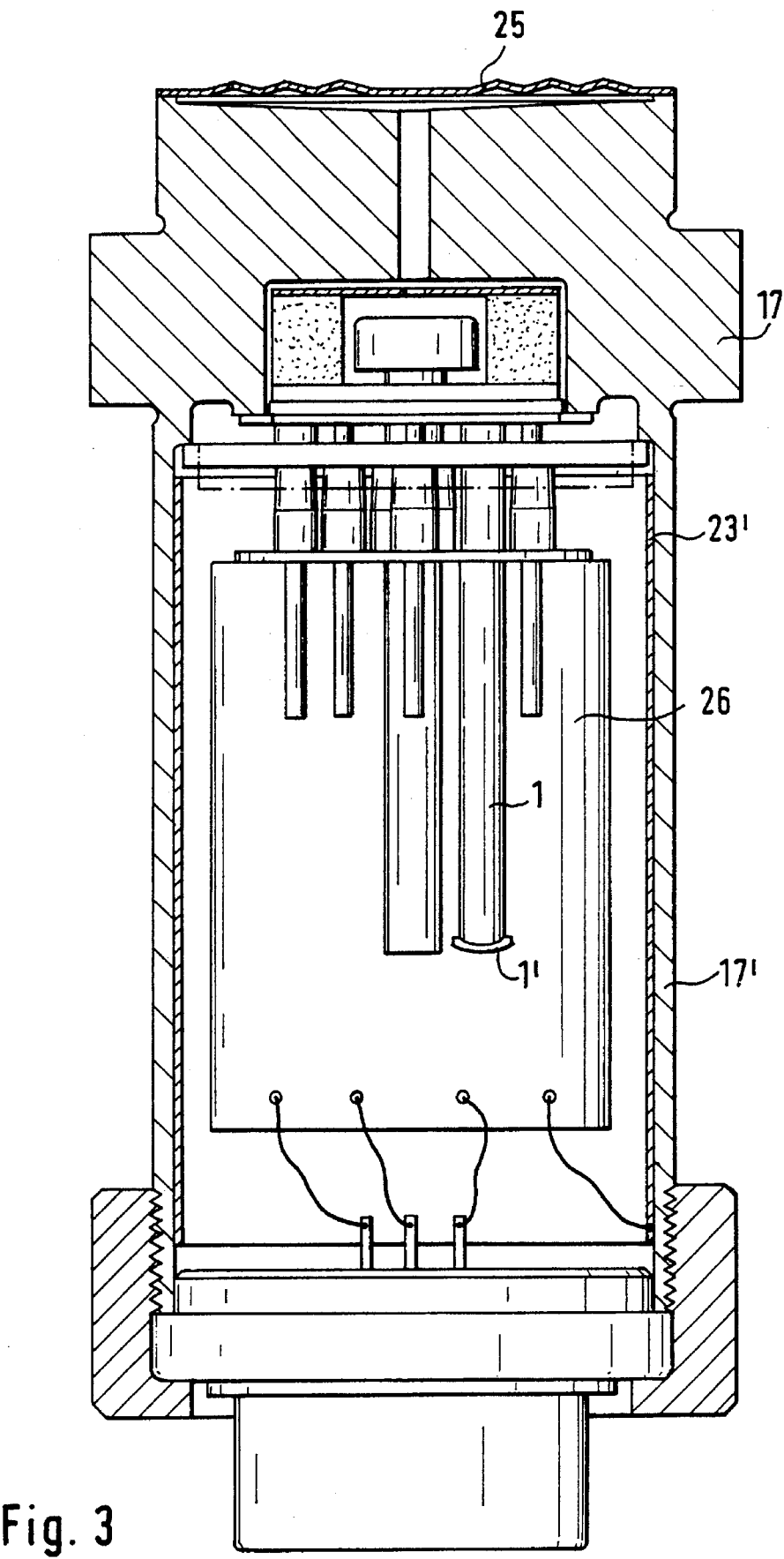
FIG. 3 is a sectional view of a further development of the pressure-measuring arrangement of FIG. 2.

A header 13 of insulating material is provided with leads 2, 3, 4, 5, 6, 7, 8 and an oil filler neck 1, which is sealed after the oil has been filled in, cf. the seal 1' in FIGS. 2 and 3. Otherwise the header 13 is of the same design as the header of a conventional TO-8 semiconductor package.

If the pressure-measuring arrangement is designed as a differential-pressure sensor, the header 13 further contains a pressure feed pipe 9, and the base 12 has a central hole 14 in which the pressure feed pipe 9 continues.

The base 12 is mounted at the center of the header 13. Electrical contacts to the strain gages 11 are made by the leads 2, . . . , 8 of the header 13, e.g., by means of thermocompression bonding wires.

The base 12 includes a perimeter edge and the substrate 10' includes a perimeter edge that abuts the perimeter edge of the base 12.

The substrate 10' is tightly joined to the base 12, e.g., along the two edges, forming a chamber, so that the diaphragm 10 can deflect when pressure acts on it, which produces a change in the resistance of the strain gages.

A part 15 of insulating material is fitted on the leads 2, . . . , 8 projecting from the header 13, said leads entering matching holes 2', 3', 4', 5', 6', 7', 8'. The part 15 has a central opening 16 corresponding in shape to the base 12.

In the sectional view of a finished pressure-measuring arrangement shown in FIG. 2, a metal body 17 can be seen which has a first central recess 18 extending inwardly from a first outer cross-sectional surface 19. At its edge, the first cross-sectional surface 19 is tightly joined to the header 13.

A second cross-sectional surface 20, which faces away from the first cross-sectional surface 19, is provided with a second central recess 21 which is very shallow compared with the first recess 18. The two recesses 18, 21 communicate by means of a hole 22 in the metal body 17.

The first recess 18 accommodates the base 12 with the substrate 10' and the diaphragm 10 as well as the part 15 of insulating material in such a way that these parts are not in contact with the inside walls of the recess 18.

In the first recess 18, an electrically conductive foil 23 with a central opening 24 is disposed as close as possible to the strain gages 11 so that it covers at least the strain gages 11, but preferably the entire substrate 10' with the diaphragm 10, without touching these parts.

The foil 23, together with an electric connection of the substrate 10', must be connected to ground. This can be done, for example, by conductively bonding the foil 23 to metal areas 4", 5", 8" of the part 15, which are associated with the leads 4, 5, 8 (see FIG. 1). The leads have to be connected to ground at the place where the pressure-measuring arrangement is used.

A metallic separating diaphragm 25 is fitted in the second recess 21 and is tightly joined to the latter at its edge. Both recesses 18, 21 and the hole 22 are filled with oil through the oil filler neck 1. The oil serves as a means for transmitting the pressure existing outside the separating diaphragm 25 to the diaphragm 10.

Although in the arrangement according to the invention, like in the arrangement in public use, the filled-in oil covers the strain gages 11 because of the afore-mentioned opening 24 in the foil 23, the invention has the unexpected and surprising effect that it not only eliminates electromagnetic interference but also largely avoids influences on the pressure-dependent resistance changes of the strain gages, which are attributable to the property of the oil fill as a very good electric nonconductor and to the electric charging of the oil fill.

FIG. 3 shows a further development of the arrangement of FIG. 2, also in a sectional view. The metal body 17 has, on the header side, a caselike extension 17' which accommodates a circuit board 26 connected to the strain gages 11. The circuit board contains a compensation circuit, particularly a temperature compensation circuit.

In a preferred embodiment of the invention, a further electrically conductive foil 23' is provided along the inside of the extension 17'. This foil, like the foil 23, has to be connected to ground.

We claim:

1. A pressure-measuring arrangement comprising:
    a pressure sensor having a base, an associated diaphragm having an upper surface, and a strain gage situated on the upper surface of the diaphragm,
    a header of insulating material having leads and an oil filler neck, said header of insulating material having the base mounted thereon and said leads making electrical contact to the strain gage,
    a metal body having a first central recess in a first cross-sectional surface, a second central recess in a second cross-sectional surface facing away from the first cross-sectional surface, and a hole connecting the first recess with the second recess, said first cross-sectional surface being tightly joined at its edge to the header of insulating material, and said first recess accommodating the substrate and the diaphragm without touching them,
    an electrically conductive foil having an opening, said foil being disposed in the first recess as close as possible to, and covering but not touching, the strain gage and connected to ground,
    a metallic separating diaphragm fitted in the second recess and closing the latter at its edge, and
    an oil fill in the recesses and in the hole.

2. A pressure-measuring arrangement as claimed in claim 1, further comprising a pressure feed pipe extending through the header of insulating material and the base.

3. A pressure-measuring arrangement as claimed in claim 2, comprising a caselike extension of the metal body on the header side.

4. A pressure-measuring arrangement as claimed in claim 3, comprising a further electrically conductive foil which is provided along the inside of the extension and connected to ground.

5. A pressure-measuring arrangement as claimed in claim 1, comprising a caselike extension of the metal body on the header side.

6. A pressure-measuring arrangement as claimed in claim 5, comprising a further electrically conductive foil which is provided along the inside of the extension and connected to ground.

7. A pressure sensor comprising
    a diaphragm having an upper surface,
    a strain gage situated on the upper surface of the diaphragm, and
    an electrically conductive foil situated as close as possible to, and covering but not touching, the strain gage.

8. The pressure sensor of claim 7, wherein the electrically conductive foil is formed to include an opening.

9. The pressure sensor of claim 7, wherein the electrically conductive foil is connected to ground.

10. A pressure-measuring arrangement comprising
    a housing,
    a pressure sensor having a base, an associated diaphragm having an upper surface, and a strain gage situated on the upper surface of the diaphragm, the base being situated in the housing, and
    an electrically conductive foil being situated as close as possible to, and covering but not touching, the strain gage.

11. The pressure-measuring arrangement of claim 10, wherein the electrically conductive foil is formed to include an opening.

12. The pressure-measuring arrangement of claim 10, further comprising a second electrically conductive foil situated along an inner surface of the housing.

* * * * *